United States Patent
Zhu et al.

(10) Patent No.: US 10,117,087 B2
(45) Date of Patent: Oct. 30, 2018

(54) TERMINAL CLUSTERING

(71) Applicant: FUJITSU LIMITED, Kawasaki-shi, Kanagawa (JP)

(72) Inventors: Chenxi Zhu, Fairfax, VA (US); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/908,974

(22) PCT Filed: Jan. 7, 2014

(86) PCT No.: PCT/US2014/010535
§ 371 (c)(1),
(2) Date: Jan. 29, 2016

(87) PCT Pub. No.: WO2015/016963
PCT Pub. Date: Feb. 5, 2015

(65) Prior Publication Data
US 2016/0192176 A1   Jun. 30, 2016

Related U.S. Application Data

(60) Provisional application No. 61/861,402, filed on Aug. 1, 2013.

(51) Int. Cl.
*H04W 76/23*   (2018.01)
*H04W 8/00*   (2009.01)
(Continued)

(52) U.S. Cl.
CPC .......... *H04W 8/005* (2013.01); *H04B 7/0456* (2013.01); *H04B 7/0617* (2013.01);
(Continued)

(58) Field of Classification Search
CPC .......... H04W 76/023; H04W 72/0406; H04W 72/0473; H04W 56/001; H04W 8/186;
(Continued)

(56) References Cited

U.S. PATENT DOCUMENTS 5,850,592 A * 12/1998 Ramanathan ......... H04W 52/36
455/7
6,493,759 B1 * 12/2002 Passman ................. H04L 45/04
455/446

(Continued)

OTHER PUBLICATIONS

U.S. Office Action issued in corresponding U.S. Appl. No. 14/909,080, dated Jun. 22, 2017.

(Continued)

*Primary Examiner* — Christine Ng
(74) *Attorney, Agent, or Firm* — Maschoff Brennan (57) ABSTRACT

A method includes checking for a first cluster beacon associated with a first cluster. The first cluster is an open cluster. The method further includes transmitting a second cluster beacon associated with a second cluster. Transmitting the second cluster beacon is done in response to failing to receive the first cluster beacon. The method further includes receiving a first request in response to transmitting the second cluster beacon. The first request includes a request by a first terminal to join the second cluster. The method further includes receiving a second request in response to transmitting the second cluster beacon. The second request includes a request by a second terminal to join the second cluster.

12 Claims, 6 Drawing Sheets

(51) Int. Cl.

| | |
|---|---|
| *H04B 7/0456* | (2017.01) |
| *H04B 7/06* | (2006.01) |
| *H04W 24/02* | (2009.01) |
| *H04W 74/00* | (2009.01) |
| *H04W 52/24* | (2009.01) |
| *H04W 72/04* | (2009.01) |
| *H04W 8/18* | (2009.01) |
| *H04W 56/00* | (2009.01) |
| *H04W 72/10* | (2009.01) |
| *H04W 28/04* | (2009.01) |
| *H04W 4/70* | (2018.01) |
| *H04W 76/14* | (2018.01) |

(52) U.S. Cl.
CPC ............ *H04B 7/0639* (2013.01); *H04W 4/70* (2018.02); *H04W 8/186* (2013.01); *H04W 24/02* (2013.01); *H04W 28/04* (2013.01); *H04W 52/241* (2013.01); *H04W 52/242* (2013.01); *H04W 52/243* (2013.01); *H04W 56/001* (2013.01); *H04W 72/042* (2013.01); *H04W 72/0406* (2013.01); *H04W 72/0413* (2013.01); *H04W 72/0446* (2013.01); *H04W 72/0473* (2013.01); *H04W 72/10* (2013.01); *H04W 74/006* (2013.01); *H04W 76/14* (2018.02)

(58) Field of Classification Search
CPC ............... H04W 72/10; H04W 72/042; H04W 72/0446; H04W 72/0413; H04W 52/242; H04W 52/241; H04W 28/048; H04W 74/006; H04W 52/243; H04W 4/005; H04W 24/02; H04W 8/005; H04B 7/0639; H04B 7/0617; H04B 7/0456
See application file for complete search history.

(56) References Cited

U.S. PATENT DOCUMENTS

| | | | |
|---|---|---|---|
| 6,711,409 B1* | 3/2004 | Zavgren, Jr. ......... | H04W 40/32 370/242 |
| 7,978,631 B1* | 7/2011 | Abdelaziz ........... | H04L 61/1582 370/255 |
| 8,355,736 B2 | 1/2013 | Mitra et al. | |
| 2006/0045130 A1 | 3/2006 | Kim et al. | |
| 2007/0010270 A1 | 1/2007 | Dillon | |
| 2007/0165569 A1 | 7/2007 | Kaminski | |
| 2007/0254643 A1 | 11/2007 | Garcia et al. | |
| 2008/0253327 A1* | 10/2008 | Kohvakka ............. | H04W 16/14 370/330 |
| 2009/0034432 A1* | 2/2009 | Bonta ................... | H04W 74/02 370/255 |
| 2010/0075689 A1 | 3/2010 | Uemura et al. | |
| 2010/0093364 A1 | 4/2010 | Ribeiro | |
| 2010/0148940 A1* | 6/2010 | Gelvin ................... | H04L 67/12 340/286.02 |
| 2010/0291962 A1 | 11/2010 | Kim et al. | |
| 2010/0303034 A1 | 12/2010 | Chen et al. | |
| 2011/0032909 A1* | 2/2011 | Park ...................... | H04W 36/22 370/332 |
| 2011/0151887 A1 | 6/2011 | Hakola | |
| 2011/0319097 A1 | 12/2011 | Wirola | |
| 2012/0021704 A1 | 1/2012 | Chan et al. | |
| 2012/0129540 A1 | 5/2012 | Hakola et al. | |
| 2012/0236909 A1 | 9/2012 | Ma et al. | |
| 2013/0138792 A1* | 5/2013 | Preden ............... | H04W 52/0216 709/223 |
| 2013/0308714 A1 | 11/2013 | Xu et al. | |
| 2013/0308715 A1 | 11/2013 | Nam et al. | |
| 2014/0098759 A1 | 4/2014 | Noh et al. | |
| 2014/0098761 A1 | 4/2014 | Lee et al. | |
| 2014/0177683 A1 | 6/2014 | Krishnamurthy et al. | |
| 2014/0328329 A1 | 11/2014 | Novlan et al. | |
| 2014/0376458 A1 | 12/2014 | Ryu et al. | |
| 2015/0016312 A1 | 1/2015 | Li et al. | |
| 2015/0173105 A1 | 6/2015 | Bergstrom et al. | |
| 2015/0223279 A1* | 8/2015 | Jiao ....................... | H04W 48/12 370/312 |
| 2015/0257173 A1 | 9/2015 | You et al. | |
| 2015/0296518 A1 | 10/2015 | Yi et al. | |
| 2015/0359004 A1 | 12/2015 | Xu et al. | |
| 2016/0142981 A1 | 5/2016 | Yi et al. | |
| 2016/0150570 A1 | 5/2016 | Wang et al. | |

OTHER PUBLICATIONS

U.S. Office Action issued in corresponding U.S. Appl. No. 14/909,082, dated Nov. 10, 2016.
U.S. Office Action issued in corresponding U.S. Appl. No. 14/909,082, dated Apr. 28, 2017.
U.S. Office Action issued in corresponding U.S. Appl. No. 14/909,077, dated May 22, 2017.
U.S. Office Action issued in corresponding U.S. Appl. No. 14/908,980, dated Aug. 11, 2017.
U.S. Office Action issued in U.S. Appl. No. 14/908,858, dated Sep. 15, 2017.
U.S. Office Action issued in U.S. Appl. No. 14/909,082, dated Sep. 15, 2017.
Advisory Action issued in related U.S. Appl. No. 14/909,082, dated Aug. 10, 2017.
Office Action in U.S. Appl. No. 14/909,080 dated Apr. 23, 2018.

* cited by examiner

Fig. 6

TERMINAL CLUSTERING

FIELD

The embodiments discussed herein are related to terminal clustering.

BACKGROUND

Terminal-to-terminal communication may allow data transmissions to be made directly between two or more terminals of a telecommunication system. The terminal-to-terminal communication may overlay regular cellular communications, and may be performed with or without cellular network coverage.

In some instances, using terminal-to-terminal communication may increase network capacity. For example, terminal-to-terminal communication may permit spatial multiplexing, which may allow for higher relative spectrum usage. Employing terminal-to-terminal communication may also permit throughput between terminals to be increased if a terminal-to-terminal link experiences better channel quality than a cellular link. Using terminal-to-terminal communication may reduce resource usage when data is transmitted once between two terminals during a terminal-to-terminal transmission, as compared to transmitting the same data twice between the two terminals over a cellular link, i.e., once through an uplink (UL) transmission from a transmitting terminal to a base station and once through a downlink (DL) transmission to a receiving terminal from the base station.

Terminal-to-terminal communication may reduce communication latency of a telecommunication network. For example, terminal-to-terminal communication may not relay data through a base station and/or a core network, thus potentially reducing the transit time of the data and/or the load on the base station and/or the core network.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method includes checking for a first cluster beacon associated with a first cluster. The first cluster is an open cluster. The method further includes transmitting a second cluster beacon associated with a second cluster. Transmitting the second cluster beacon is done in response to failing to receive the first cluster beacon. The method further includes receiving a first request in response to transmitting the second cluster beacon. The first request includes a request by a first terminal to join the second cluster. The method further includes receiving a second request in response to transmitting the second cluster beacon. The second request includes a request by a second terminal to join the second cluster.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein may relate to a telecommunication system based on the 3rd Generation Partnership Project's (3GPP) Long Term Evolution (LTE) radio access network. Descriptions involving LTE may also apply to 3GPP's Long Term Evolution Advanced (LTE-A) radio access network. However, the embodiments described herein are not limited to the example telecommunication systems described. Rather, the embodiments described herein may also be applicable to other telecommunication systems.

Embodiments of the present invention will be explained with reference to the accompanying drawings.

Figure 1:
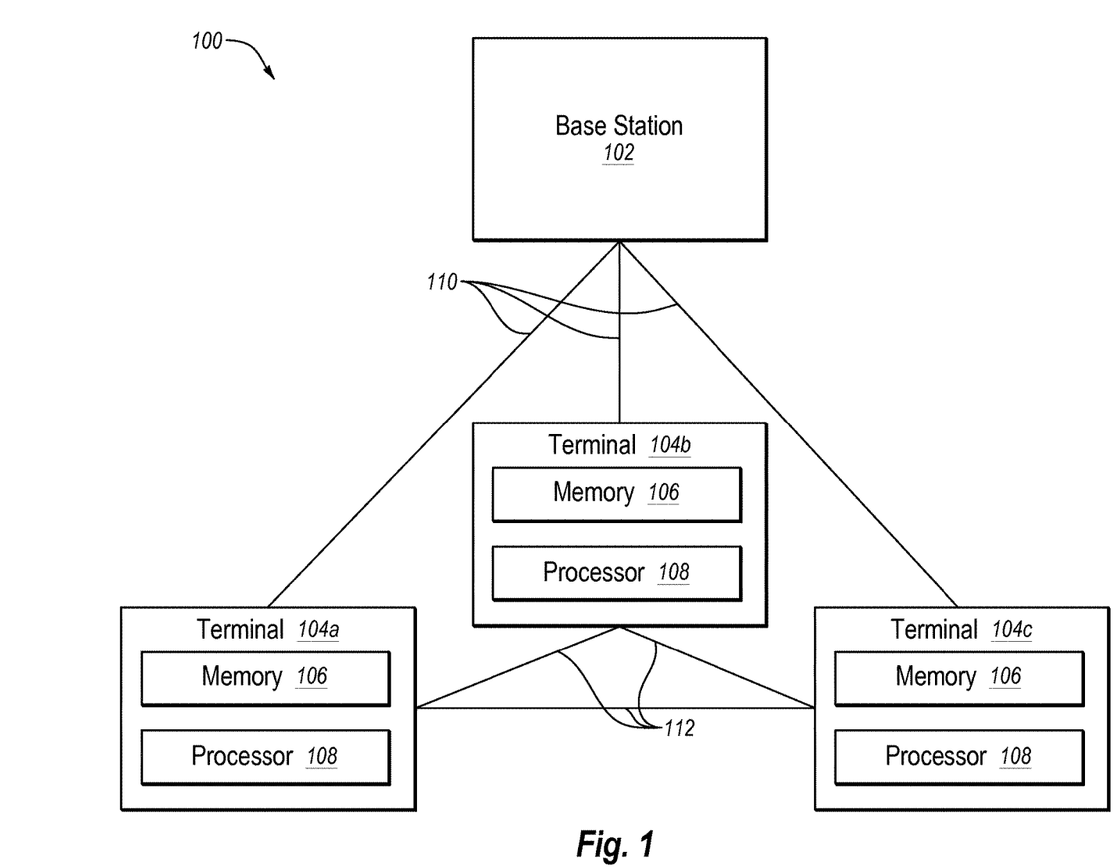
FIG. 1 is a diagrammatic view of an example telecommunication system.

FIG. 1 is a diagrammatic view of an example telecommunication system 100, arranged in accordance with at least one embodiment described herein. In some embodiments, a network architecture of the telecommunication system 100 may include the network architecture of an Evolved Universal Mobile Telecommunications System (E-UMTS). The E-UMTS may include an LTE radio access network, for instance. The radio access network may include an E-UMTS Terrestrial Radio Access Network (E-UTRAN). However, other types of network architecture may alternately or additionally be used.

The telecommunication system 100 may include a base station 102. The base station 102 may include base station equipment, including hardware and/or software for radio communication with radio-communication-equipped nodes ("wireless nodes") which may be described herein as devices. For example, the base station 102 may be equipped for radio communication 110 with devices such as terminal 104a, terminal 104b, and terminal 104c (collectively "terminals 104"). The base station 102 may generally allow the wireless nodes, including the terminals 104, to wirelessly communicate with each other and/or to wirelessly access a network (not shown) via radio communication 110 with the base station 102.

The base station 102 may include hardware and software for radio communication over a licensed spectrum. The licensed spectrum may generally include portions of a radio spectrum licensed for transmission of wireless data, such as cellular data. For example, the base station 102 may be configured to transmit cellular data that complies with an LTE radio access network, such as an LTE radio access network according to 3GPP LTE specification releases 8-12.

The base station 102 may include an E-UTRAN NodeB (eNB) associated with LTE radio access networks.

The terminals 104 may include equipment configured to allow the terminals 104 to transmit and receive data via wireless communications via the licensed spectrum. For example, the terminals 104 may include hardware, such as one or more antennas for transmitting and receiving radio transmissions, and codecs. The terminals 104 may include mobile phones, tablet computers, laptop computers, and/or other electronic devices that may use radio communication. Alternately or additionally, the terminals 104 may include devices that employ machine-type communication (MTC). The terminals 104 may include user equipment (UE) associated with LTE radio access networks.

Each of the terminals 104 may include memory 106 and a processor 108. The memory 106 may include a non-transitory computer-readable medium. Instructions such as programming code executable by the processor 108 may be encoded in the memory 106. When the instructions are executed by the processor 108, the associated terminals 104a, 104b, and 104c may perform operations related to and/or including the processes described herein.

The terminals 104 may be equipped for terminal-to-terminal communication 112, which may include device-to-device (D2D) communication associated with LTE radio access networks. The terminal-to-terminal communication 112 may allow the terminals 104 to transmit and/or receive data among the terminals 104 without routing the data through the base station 102.

Figure 2:
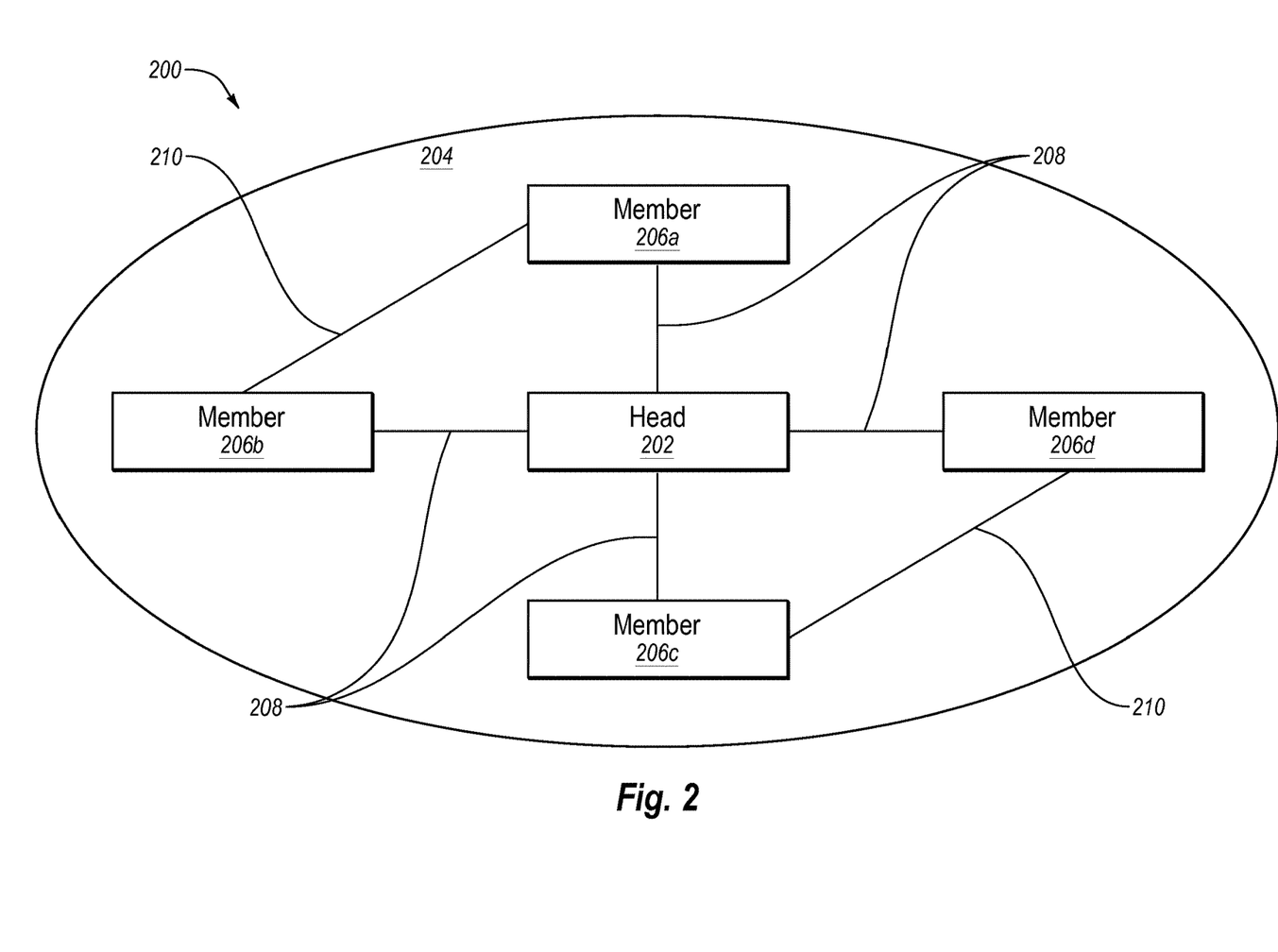
FIG. 2 is a diagrammatic view of an example cluster that may be implemented in the telecommunication system of FIG. 1.

FIG. 2 is a diagrammatic view of an example cluster 200. In some embodiments, the cluster 200 may be implemented in the example telecommunication system 100 of FIG. 1. The cluster 200 may include a cluster head 202. The cluster 200 may also include a cluster member 206a, a cluster member 206b, a cluster member 206c, and a cluster member 206d (collectively "cluster members 206"). The cluster members 206 may be terminals generally corresponding to the terminals 104 of FIG. 1. The cluster members 206 may be within a transmission range 204 of the cluster head 202. The cluster members 206 may or may not be within a transmission range (not shown) of each of the other cluster members 206. The cluster 200 may enable cluster-member-to-cluster-member communication 210. The cluster-member-to-cluster-member communication 210 may generally correspond to the terminal-to-terminal communication 112 of FIG. 1.

In some embodiments, the cluster head 202 may be a base station generally corresponding to the base station 102 of FIG. 1. For example, a base station may be the cluster head 202 for cluster members 206 located within a cell generally corresponding to the transmission range 204 of the base station. In embodiments including a base station as the cluster head 202, a cluster-member-to-cluster-head communication 208 may generally correspond to the radio communication 110 of FIG. 1. In some embodiments, when the cluster head 202 is a base station, one or more terminals generally corresponding to the terminals 104 of FIG. 1 associated with the base station for cellular communication may be cluster members 206.

Alternately, the cluster head 202 may be a terminal generally corresponding to the terminals 104 of FIG. 1. For example, a terminal may be the cluster head 202 for cluster members 206 located within a transmission range 204 of the terminal acting as the cluster head 202. The terminal acting as the cluster head 202 and/or one or more of the cluster members 206 may be outside of cellular network coverage, e.g., the cluster head 202 and/or one or more of the cluster members 206 may be outside of a transmission range of a base station. In embodiments including a terminal as the cluster head 202, the cluster-member-to-cluster-head communication 208 may generally correspond to the terminal-to-terminal communication 112 of FIG. 1.

In some embodiments, when the cluster head 202 is a terminal, other terminals may perform a communication process with the cluster head 202 to become cluster members 206. The cluster head 202 may transmit a cluster beacon. In some embodiments, resources for the cluster beacon may be configured through a radio resource control (RRC). The cluster beacon may advertise the existence of the cluster 200 and/or may provide information to be used by terminals to join the cluster 200 as one of the cluster members 206.

In some embodiments, the cluster beacon may identify resources allocated for a cluster random access channel (C-RACH) procedure. Alternately or additionally, the cluster head 202 may identify resources allocated for the C-RACH procedure in a cluster physical broadcast channel (C-PBCH).

The cluster beacon may be transmitted by the cluster head 202 periodically. Alternatively, the cluster beacon may be transmitted by the cluster head 202 pseudo-periodically or randomly. For example, the cluster head 202 may transmit the cluster beacon at random time offsets applied to regular periods.

The cluster beacon may include cluster control information. In some embodiments, the cluster control information may include a cluster identifier associated with the cluster 200. The cluster identifier may include a cluster number. As set forth below, in some embodiments, a relative value of the cluster number may affect the likelihood that a terminal attempts to join the cluster 200. The cluster head 202 may choose a cluster number from a range of cluster numbers based on a number of factors such as battery status, functionality of the cluster head 202, and/or the like.

The cluster control information may further include a time synchronization indicator. The time synchronization indicator may indicate whether the cluster head 202 is time-synchronized with a reliable external timing source. A reliable external timing source may include, for example, a global positioning service (GPS) timing source, a broadcast network, a cellular network, or the like or any combination thereof. In some embodiments, the time synchronization indicator may include a cluster synchronization (C-SYNC) bit.

In some embodiments, the cluster control information may further include a cluster status indicator. The cluster status indicator may be configured to indicate a relative available capacity of the cluster 200. For example, the cluster status indicator may include a two-bit cluster status (CS) representing the relative available capacity of the cluster 200 as set forth in the following table. Other relative available capacities may alternately or additionally be represented in the cluster status.

| CS | Relative Available Capacity |
|---|---|
| 00 | No cluster members 206 in cluster 200; cluster members 206 welcome to join the cluster 200. |
| 01 | One or more cluster members 206 in cluster 200; additional cluster members 206 are welcome to join the cluster 200. |
| 10 | Number of cluster members 206 in the cluster 200 is near a capacity of the cluster 200; additional cluster members 206 may still join the cluster 200. |
| 11 | Number of cluster members 206 in cluster 200 is at capacity |

| | |
|---|---|
| CS | Relative Available Capacity of the cluster 200; additional cluster members 206 may not join the cluster 200. |

Alternately, the cluster status indicator may include a one-bit cluster status representing whether the cluster 200 is at capacity or not at capacity, i.e., the cluster status may represent whether the cluster 200 is an open cluster or a closed cluster. Other cluster status indicators may alternately or additionally be included in the cluster control information.

Figure 3:
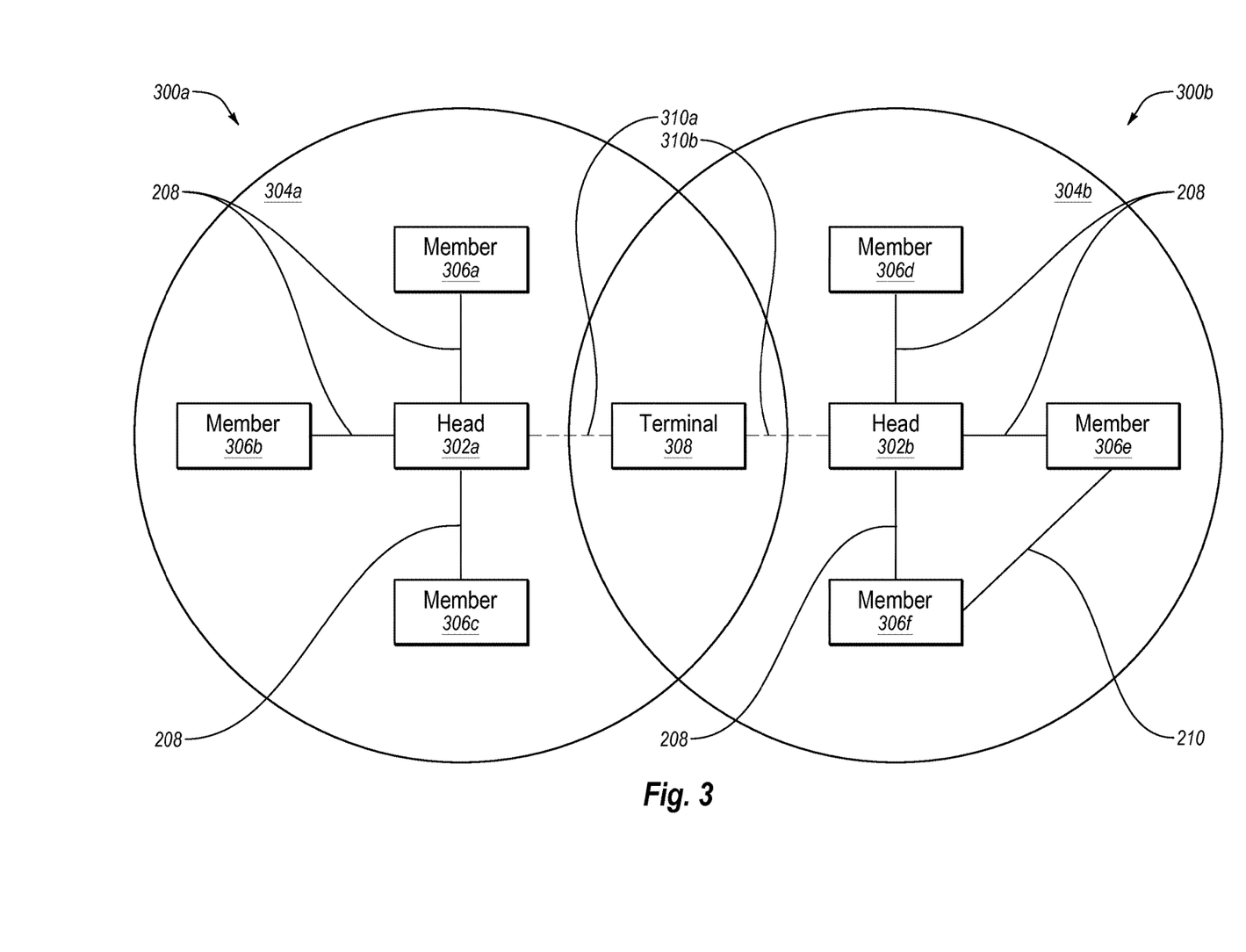
FIG. 3 is a diagrammatic view of example clusters having a terminal located within an overlap of the example clusters.

FIG. 3 is a diagrammatic view of two example clusters 300a and 300b having a terminal 308 located within an overlap of the clusters 300a and 300b. The cluster 300a may include a cluster head 302a and the cluster 300b may include a cluster head 302b. The cluster head 302a and the cluster head 302b may each generally correspond to the cluster head 202 of FIG. 2. In some embodiments, the cluster head 302a and the cluster head 302b may both be terminals. Alternately, the cluster head 302a may be a base station and the cluster head 302b may be a terminal, or vice versa. Although two clusters 300a and 300b are shown, these and other embodiments may alternately or additionally apply to three or more overlapping clusters.

The cluster head 302a may have a transmission range 304a generally corresponding to the transmission range 204 of FIG. 2. The cluster head 302b may have a transmission range 304b generally corresponding to the transmission range 204 of FIG. 2.

The cluster 300a may further include a cluster member 306a, a cluster member 306b, and a cluster member 306c generally corresponding to the cluster member 206a, the cluster member 206b, and the cluster member 206c of FIG. 2. The cluster 300b may also further include a cluster member 306d, a cluster member 306e, and a cluster member 306f generally corresponding to the cluster member 206a, the cluster member 206b, and the cluster member 206c of FIG. 2.

The cluster 300a and the cluster 300b may include some elements that are similar or identical to elements of the cluster 200 of FIG. 2, such as the cluster-member-to-cluster-head communication 208 and the cluster-member-to-cluster-member communication 210, for which a more detailed description is already provided above.

The terminal 308 may desire to join a cluster and may check for cluster beacons 310a and 310b. In response to receiving only one cluster beacon, e.g., if the cluster beacon 310a is received and the cluster beacon 310b is not received, or in response to receiving only one cluster beacon associated with an open cluster, e.g., if the cluster 300a has available capacity and the cluster 300b is at maximum capacity, the terminal 308 may respond to the cluster beacon 310a by transmitting a request to join the cluster 300a associated with the cluster beacon 310a. If one or both of the cluster beacons 310a and 310b includes a cluster status indicator that indicates that the cluster 300a and/or the cluster 300b are at capacity, the terminal 308 may consider the cluster 300a and/or the cluster 300b closed and may not choose to join the cluster 300a and/or the cluster 300b.

In response to receiving multiple cluster beacons 310a and 310b, the terminal 308 may choose to join one of the clusters 300a and 300b based on a prioritization of the cluster 300a relative to the cluster 300b. Determining the priorities of each of the clusters 300a and 300b may be based on the cluster control information included in the cluster beacons 310a and 310b.

In some embodiments, the terminal 308 may assign a higher priority to a time-synchronized cluster relative to a non-time-synchronized cluster. For example, the terminal 308 may choose to join the cluster 300a over the cluster 300b in response to the cluster beacon 310a indicating that the cluster head 302a is time-synchronized with a reliable external timing source and the cluster beacon 310b indicating that the cluster head 302b is not time-synchronized with a reliable external timing source.

In some embodiments, the terminal 308 may assign a higher priority to a cluster with a higher available capacity relative to a cluster with a lower available capacity. For example, the terminal 308 may choose to join the cluster 300a over the cluster 300b in response to a cluster status indicator of the cluster beacon 310a indicating that the cluster 300a has an available capacity that is higher than the available capacity of the cluster 300b, as indicated by the cluster beacon 310b. In some embodiments, the terminal 308 may consider the available capacity of the clusters 300a and 300b in response to the clusters 300a and 300b both being time-synchronized or both not being time-synchronized.

In some embodiments, the terminal 308 may assign a higher priority to a cluster having a cluster head with a lower mobility relative to a cluster having a cluster head with a higher mobility. Mobility of the cluster head 302a and the cluster head 302b may be based on observations of one or more qualities of the associated cluster beacons 310a and 310b over time. By way of example, the terminal 308 may choose to join the cluster 300a over the cluster 300b if the terminal 308 determines that the cluster head 302a is less mobile relative to the cluster head 302b. In some embodiments, the terminal 308 may consider the relative mobility of the cluster heads 302a and 302b in response to the cluster 300a and the cluster 300b both being time-synchronized or both not being time-synchronized, and/or the cluster 300a and the cluster 300b both having the same or similar available capacities.

In some embodiments, the terminal 308 may assign a relative priority to clusters based on the associated cluster identifiers. For example, the terminal 308 may choose to join the cluster 300a over the cluster 300b if the cluster beacon 310a includes a cluster identifier having a cluster number higher than a cluster number included in a cluster identifier of the cluster beacon 310b. In some embodiments, the terminal 308 may consider the relative value of the cluster numbers in response to the clusters 300a and 300b both being time-synchronized or both not being time-synchronized, the cluster 300a and the cluster 300b both having the same or similar available capacities, and/or the mobility of the cluster head 302a and the cluster head 302b being the same or similar.

In some embodiments, the terminal 308 may prioritize the clusters 300a and 300b according to a progression of considerations. For example, the terminal 308 may first prioritize the clusters 300a and 300b based on whether the cluster 300a and/or the cluster 300b are time-synchronized. If one of the clusters 300a and 300b has a higher priority, the terminal 308 may join the higher-priority cluster. If the clusters 300a and 300b have the same priority, in some embodiments, the terminal 308 may prioritize the clusters 300a and 300b based on the available capacity of the clusters 300a and 300b.

In response to the clusters 300a and 300b maintaining the same relative priority, the progression of considerations may continue until the terminal 308 determines that one of the clusters 300a and 300b has a higher priority. For example, the terminal 308 may prioritize the clusters 300a and 300b based on the mobility of the associated cluster heads 302a and 302b, and potentially may prioritize the clusters 300a and 300b based on the associated cluster identifier. Other factors may alternately or additionally be considered in prioritizing the clusters 300a and 300b.

Figure 4:
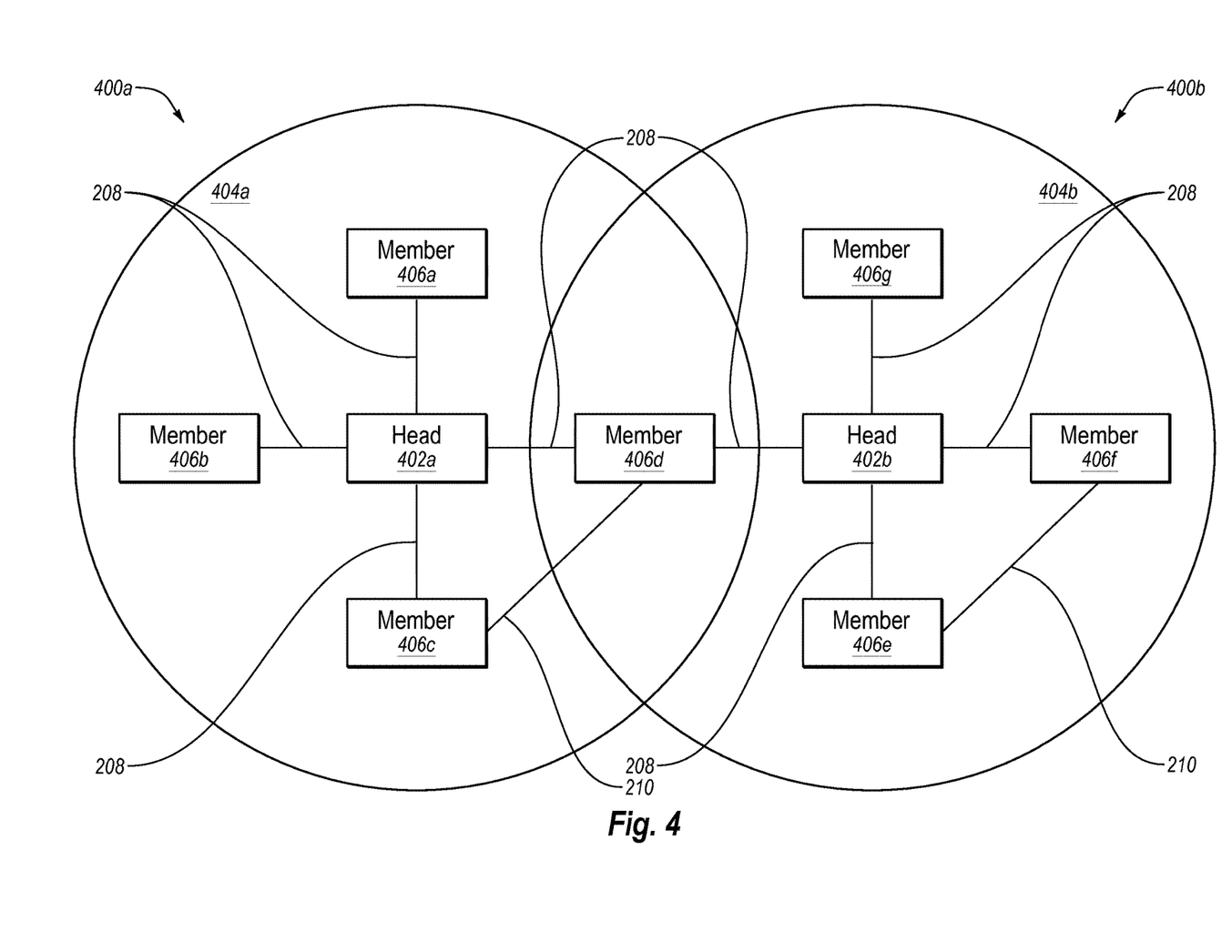
FIG. 4 is a diagrammatic view of example clusters having a cluster member located within an overlap of the example clusters.

In some embodiments, the terminal 308 may join both the cluster 300a and the cluster 300b. FIG. 4 is a diagrammatic view of a cluster 400a and a cluster 400b having a shared cluster member 406d located within an overlap. The cluster 400a may include a cluster head 402a, and the cluster 400b may include a cluster head 402b. The cluster heads 402a and 402b may generally correspond to the cluster head 202 of FIG. 2. The cluster 400a may include a cluster member 406a, a cluster member 406b, a cluster member 406c, and the shared cluster member 406d. The cluster 400b may include a cluster member 406e, a cluster member 406f, a cluster member 406g, and the shared cluster member 406d. The shared cluster member 406d and the cluster members 406a, 406b, 406c, 406e, 406f, and 406g may generally correspond to the cluster members 206 of FIG. 2.

The cluster 400a and the cluster 400b may include some elements that are similar or identical to elements of the cluster 200 of FIG. 2, such as the cluster-member-to-cluster-head communication 208 and the cluster-member-to-cluster-member communication 210, for which a more detailed description is already provided above.

The shared cluster member 406d may switch operation between the cluster 400a and the cluster 400b. For example, the shared cluster member 406d may use a discontinuous reception (DRX) mode to follow a time-division multiple access (TDMA) schedule between the cluster 400a and the cluster 400b.

In some embodiments, the shared cluster member 406d may relay communications between the cluster 400a and the cluster 400b. For example, the shared cluster member 406d may receive a communication from the cluster 400a, e.g., the shared cluster member 406d may receive a communication from the cluster head 402a, the cluster member 406a, the cluster member 406b, and/or the cluster member 406c. The shared cluster member 406d may transmit the communication to the cluster 400b, e.g., the shared cluster member 406d may transmit the communication to the cluster head 402b, the cluster member 406e, the cluster member 406f, and/or the cluster member 406g.

Figure 5:
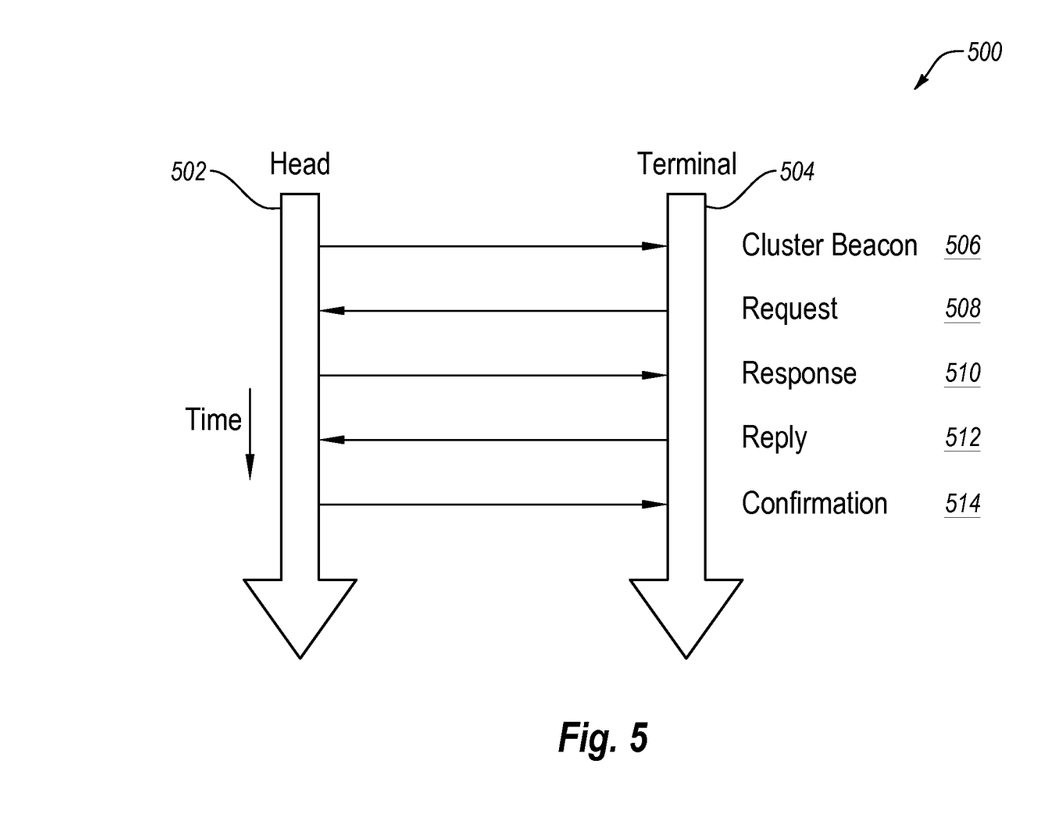
FIG. 5 is a diagrammatic view of an example communication process of associating a terminal with a cluster having a cluster head.

FIG. 5 is a diagrammatic view of an example communication process 500 of associating a terminal 504 with a cluster having a cluster head 502. In some embodiments, the communication process 500 may include a cluster random access channel (C-RACH) procedure.

The communication process 500 may begin with the cluster head 502 transmitting a cluster beacon 506 that is received by the terminal 504.

The communication process 500 may continue with the terminal 504 transmitting a request 508 to join the cluster that is received at the cluster head 502. The request 508 may include a cluster identifier included in the cluster beacon 506. In some embodiments, the request 508 may include a C-RACH request (C-RACH-REQ).

In some embodiments, the communication process 500 may continue with the cluster head 502 transmitting a response 510 to the terminal 504. The response 510 may identify resources allocated for a reply 512. The response 510 may include a C-RACH response (C-RACH-RSP). In some embodiments, the communication process 500 may continue with the terminal 504 transmitting the reply 512 to the cluster head 502. The reply 512 may include information about the terminal 504, information about the link between the cluster head 502 and the terminal 504, and/or the like. The reply 512 may include a C-RACH reply (C-RACH-REPLY).

The communication process 500 may continue with the cluster head 502 transmitting a confirmation 514. The confirmation 514 may include a cluster-specific identifier for the terminal 504. For example, the confirmation 514 may include a cluster radio-network temporary identifier (C-RNTI) as an identifier for the terminal 504 in the cluster.

Referring again to FIG. 2, connectivity between the cluster head 202 and the cluster members 206, and/or connectivity among the cluster members 206 may depend on a transmission power of the cluster head 202. In some embodiments, the transmission power of the cluster head 202 may be adjusted based on a number of terminals within the transmission range 204 of the cluster head 202. The transmission power of the cluster head 202 may be reduced to reduce the size of the transmission range 204 and potentially reduce the number of cluster members 206 in the cluster 200. Alternately, the transmission power of the cluster head 202 may be increased to increase the size of the transmission range 204 and potentially increase the number of cluster members 206 in the cluster 200. In some embodiments, a link budget between each of the cluster members 206 and the cluster head 202 may be roughly symmetric.

The cluster members 206 may set a default transmission power associated with the cluster 200. The default transmission power of each of the cluster members 206 may be based on an estimated path loss between each of the cluster members 206 and the cluster head 202. The estimated path loss between each of the cluster members 206 and the cluster head 202 may be based on the cluster beacon transmitted by the cluster head 202. Alternately or additionally, the default transmission power of each of the cluster members 206 associated with the cluster 200 may be based on power control commands transmitted by the cluster head 202. The default transmission powers of each of the cluster members 206 in the cluster 200 may be different. The cluster members 206 may perform cluster-member-to-cluster-member communication 210 directly between two or more cluster members 206. The cluster-member-to-cluster-member communication 210 may generally correspond to the terminal-to-terminal communication 112 of FIG. 1.

In some embodiments, the cluster head 202 may manage the cluster-member-to-cluster-member communication 210 within the cluster 200. The high received power threshold and/or the low received power threshold may be configured by the cluster head 202 through the RRC. For example, the cluster head 202 may set a high received power threshold and/or a low received power threshold for a particular cluster-member-to-cluster-member communication 210. Alternately, the cluster head 202 may set the high received power threshold and/or the low received power threshold for all or a subset of all the cluster-member-to-cluster-member communication 210 in the cluster 200.

The high received power threshold may be represented by the symbol $Th^H$. The high received power threshold may represent a power above which a cluster-member-to-cluster-member communication 210 may be successfully received by the cluster members 206 in a bidirectional link. By way of example, a bidirectional link between the cluster member 206a and the cluster member 206b may allow cluster-member-to-cluster-member communication 210 between the cluster member 206a and the cluster member 206b. Both the cluster member 206a and the cluster member 206b may receive the cluster-member-to-cluster-member communication 210 with a power above the high received power threshold.

The low received power threshold may be represented by the symbol $Th^L$. The low received power threshold may represent a power below which an attempted cluster-member-to-cluster-member communication 210 may be unsuccessfully received and/or not received by the cluster members 206 in an interference link. By way of example, an interference link between the cluster member 206a and the cluster member 206b may not allow cluster-member-to-cluster-member communication 210 between the cluster member 206a and the cluster member 206b. In some embodiments, an interference link may not be used in cluster-member-to-cluster-member communication 210.

A path loss between two of the cluster members 206 may be represented by a symbol PL. A path loss between the cluster member 206a and the cluster member 206b may be represented by the symbol $PL_{a-b}$.

A default transmission power associated with the cluster 200 by the cluster member 206a may be represented by a symbol $P^D_a$, and a default transmission power associated with the cluster 200 by the cluster member 206b may be represented by a symbol $P^D_b$.

A cluster-member-to-cluster-member communication 210 transmitted by the cluster member 206b at the cluster member 206b default transmission power may be received at the cluster member 206a at a received power represented by $PL_{a-b} \cdot P^D_b$. Conversely, the power of a terminal-to-terminal transmission received at the cluster member 206b when transmitted from the cluster member 206a at the default power may be represented by $PL_{a-b} \cdot P^D_a$.

The cluster member 206a and the cluster member 206b may have a bidirectional link as a result of the cluster-member-to-cluster-member communication 210 being received at both the cluster member 206a and the cluster member 206b with received power equal to or greater than the high received power threshold. Put another way, the cluster member 206a and the cluster member 206b may have a bidirectional link at the default transmission powers of the cluster member 206a and the cluster member 206b when the following formula 1 and formula 2 are both true.

$$PL_{a-b} \cdot P^D_b \geq Th^H \qquad \text{Formula 1:}$$

$$PL_{a-b} \cdot P^D_a \geq Th^H \qquad \text{Formula 2:}$$

In some embodiments, if one or both of formula 1 and formula 2 are not true, the transmission power of the cluster terminal 206a may be increased and/or the transmission power of the cluster terminal 206b may be increased so that the cluster-member-to-cluster-member communication 210 is received at the cluster member 206a and at the cluster member 206b with a received power equal to or greater than the high received power threshold. Put another way, the cluster members 206 may change the transmission power of cluster-member-to-cluster-member communication 210 to form bidirectional links.

The cluster members 206 may exchange cluster-member-to-cluster-member communication 210 over the bidirectional links.

The cluster member 206a and the cluster member 206b may have a unidirectional link as a result of the power of the cluster-member-to-cluster-member communication 210 being received at only one of the cluster member 206a and the cluster member 206b with a received power greater than or equal to the high received power threshold. In some embodiments, a unidirectional link may be used for one-way cluster-member-to-cluster-member communication 210. In these and other embodiments, one or more of the cluster members 206 may change the transmission power of the cluster-member-to-cluster-member communication 210 to turn the unidirectional links into bidirectional links.

The cluster member 206a and the cluster member 206b may have an interference link as a result of the power of the cluster-member-to-cluster-member communication 210 being received at both the cluster member 206a and the cluster member 206b with a received power less than or equal to the low received power threshold. In some embodiments, the interference links may not be used by the cluster members 206 for cluster-member-to-cluster-member communication 210. Alternately or additionally, the cluster members 206 may change the transmission power of the cluster-member-to-cluster-member communication 210 to turn the interference links into unidirectional links and/or bidirectional links.

Figure 6:
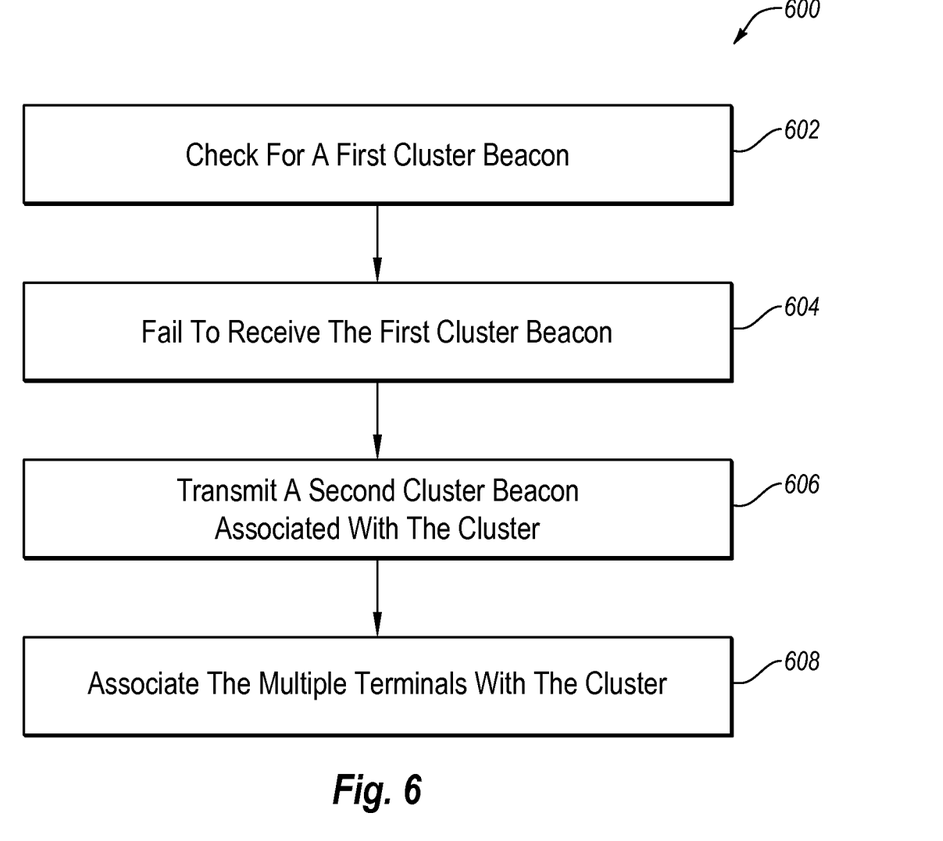
FIG. 6 is a flowchart of an example method of forming a cluster.

FIG. 6 is a flowchart of an example method 600 of forming a cluster generally corresponding to the cluster 200 of FIG. 2. In some embodiments, the method 600 may be performed by a terminal generally corresponding to the terminals 104 of FIG. 1. For example, a terminal wanting to perform terminal-to-terminal communication generally corresponding to the terminal-to-terminal communication 112 of FIG. 1 may perform the method 600.

The method 600 may begin at block 602 by checking for a first cluster beacon associated with an open cluster. An open cluster may refer to a cluster that is not at capacity and may accept one or more additional cluster members.

The method 600 may continue at block 604 by failing to receive the first cluster beacon. For example, a terminal performing the method 600 may be outside of the transmission range of a cluster head associated with an open cluster. Alternately, one or more cluster beacons associated with closed clusters may be received. In some instances, the terminal performing the method 600 may be performed by a terminal that was formerly a cluster member of a cluster that is no longer in range and/or was disbanded by the cluster head associated with the cluster.

The method 600 may continue at block 606 by transmitting a second cluster beacon. A terminal performing the method 600 may thus elect to become a cluster head. In these and other embodiments, the second cluster beacon may include a cluster identifier, a time synchronization indicator, and/or a cluster status indicator.

In some embodiments, a terminal performing the method 600 may determine whether the terminal possesses certain qualities before transmitting the second cluster beacon and/or electing to become the cluster head. For example, the terminal may determine whether the terminal may support certain security functions such as authentication, authorization, and/or accounting (AAA) security functions. Alternately or additionally, the terminal may determine whether the terminal possesses available power above a particular threshold, and/or hardware that meets particular performance thresholds. In some embodiments, terminals may be encouraged to support certain security functions, hardware performance, and/or power availability before electing to become a cluster head and/or transmitting the second cluster beacon.

The method 600 may continue at block 608 by associating multiple terminals to the cluster. Once associated with the cluster, the multiple terminals may become cluster members.

In some embodiments, associating the multiple terminals to the cluster may include receiving a request from an individual terminal of the multiple terminals. The request may include the cluster identifier included in the second cluster beacon. A response may be transmitted to the individual terminal. The response may include an identification of resources allocated for a reply. The reply may be received from the individual terminal via the resources allocated for the reply. A confirmation may be transmitted to the individual terminal. In some embodiments, the confirmation may include a cluster-specific identifier for the individual terminal.

In some embodiments, associating multiple terminals to the cluster may be accomplished via a communication process generally corresponding to the communication process 500 described with reference to FIG. 5.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 600 may further include receiving a third cluster beacon. The third cluster beacon may be associated with a second cluster. The method 600 may include determining that the second cluster has a priority relatively higher than a priority of the cluster and disbanding the cluster. In some embodiments, an RRC signal may be used to disband the cluster.

In response to disbanding the cluster, the cluster head and the cluster members may become clusterless and may check for cluster beacons. In some instances, one or more of the cluster head and/or the cluster members may receive the third cluster beacon and may join the second cluster. Alternately or additionally, one or more of the former cluster members may elect to become cluster heads and may broadcast a new cluster beacon in an attempt to start a new cluster.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of joining a first cluster including a first cluster head, the method comprising:

receiving a first cluster beacon from the first cluster head, the first cluster beacon associated with the first cluster, the first cluster beacon including first cluster control information, including a first status indicator configured to indicate, at least, that the first cluster is at a cluster size capacity or is not at the cluster size capacity, the first cluster control information further including a first time synchronization indicator configured to indicate, at least, whether the first cluster head is time-synchronized with a predetermined timing source external to the first cluster head;

receiving a second cluster beacon from a second cluster head, the second cluster beacon associated with a second cluster, the second cluster beacon including second cluster control information, including a second status indicator configured to indicate, at least, that the second cluster is at the cluster size capacity or is not at the cluster size capacity, the second cluster control information further including a second time synchronization indicator configured to indicate, at least, whether the second cluster head is time-synchronized with a predetermined timing source external to the second cluster head;

choosing to join the first cluster based at least in part on the first status indicator and the first time synchronization indicator of the first cluster control information and the second status indicator and the second time synchronization indicator of the second cluster control information; and transmitting a request to join the first cluster to the first cluster head.

2. The method of claim 1, wherein:

the first cluster control information includes a first cluster identifier;

the second cluster control information includes a second cluster identifier; and the request to join the first cluster includes the first cluster identifier.

3. The method of claim 1, wherein choosing to join the first cluster is further based at least in part on a first relative mobility of the first cluster head and a second relative mobility of the second cluster head, the first relative mobility based at least in part on the first cluster beacon, and the second relative mobility based at least in part on the second cluster beacon.

4. The method of claim 1, further comprising:

choosing to join the second cluster;

transmitting a request to join the second cluster;

receiving a communication from the first cluster; and transmitting the communication to the second cluster.

5. The method of claim 1, further comprising:

receiving a high received power threshold from the first cluster head; and increasing a terminal-to-terminal transmission power based at least in part on the high received power threshold.

6. The method of claim 1, wherein at least one of the predetermined timing source external to the first cluster head and the predetermined timing source external to the second cluster head includes at least one of a global positioning system (GPS) timing source, a broadcast network, and a cellular network.

7. A terminal including a non-transitory computer-readable medium having encoded therein programming code executable by a processor to perform operations comprising:

checking for a first cluster beacon from a first cluster head, the first cluster beacon associated with a first cluster, the first cluster beacon including first cluster control information, including a first status indicator configured to indicate, at least, that the first cluster is at a cluster size capacity or is not at the cluster size capacity, the first cluster control information further including a first time synchronization indicator configured to indicate, at least, whether the first cluster head is time-synchronized with a predetermined timing source external to the first cluster head;

checking for a second cluster beacon from a second cluster head, the second cluster beacon associated with a second cluster, the second cluster beacon including second cluster control information, including a second status indicator configured to indicate, at least, that the second cluster is at the cluster size capacity or is not at the cluster size capacity, the second cluster control information further including a second time synchronization indicator configured to indicate, at least, whether the second cluster head is time-synchronized with a predetermined timing source external to the second cluster head;

in response to receiving the first cluster beacon and failing to receive the second cluster beacon, transmitting a request to join the first cluster; and in response to receiving the first cluster beacon and receiving the second cluster beacon:

choosing to join the first cluster based at least in part on the first status indicator and the first time synchronization indicator of the first cluster control information and the second status indicator and the second time synchronization indicator of the second cluster control information, and transmitting a request to join the first cluster.

8. The terminal of claim 7, wherein prioritizing the first cluster relative to the second cluster is further based at least in part on one or more of:

a first cluster status of the first cluster control information and a second cluster status of the second cluster control information;

a first relative mobility of the first cluster head and a second relative mobility of the second cluster head; and a first cluster identifier of the first cluster control information and a second cluster identifier of the second cluster control information.

9. The terminal of claim 7, wherein in response to failing to receive the first cluster beacon and failing to receive the second cluster beacon, the operations further include:

electing to become a third cluster head; and transmitting a third cluster beacon associated with a third cluster.

10. The terminal of claim 9, the terminal including:

an authentication security function;

an authorization security function; and an accounting security function.

11. The terminal of claim 9, wherein the operations further include:

checking for a fourth cluster beacon from a fourth cluster head, the fourth cluster beacon associated with a fourth cluster, the fourth cluster beacon including fourth cluster control information;

determining via the fourth cluster control information that the fourth cluster has a higher priority relative to the third cluster; and disbanding the third cluster.

12. The terminal of claim 7, wherein at least one of the predetermined timing source external to the first cluster head and the predetermined timing source external to the second cluster head includes at least one of a global positioning system (GPS) timing source, a broadcast network, and a cellular network.

* * * * *